Oct. 26, 1965     H. A. SCHURICHT     3,214,004
CONVEYOR SYSTEM

Filed Dec. 12, 1962     8 Sheets-Sheet 1

INVENTOR.
HENRY A. SCHURICHT
BY Cullen, Sloman & Cantor
ATTORNEYS

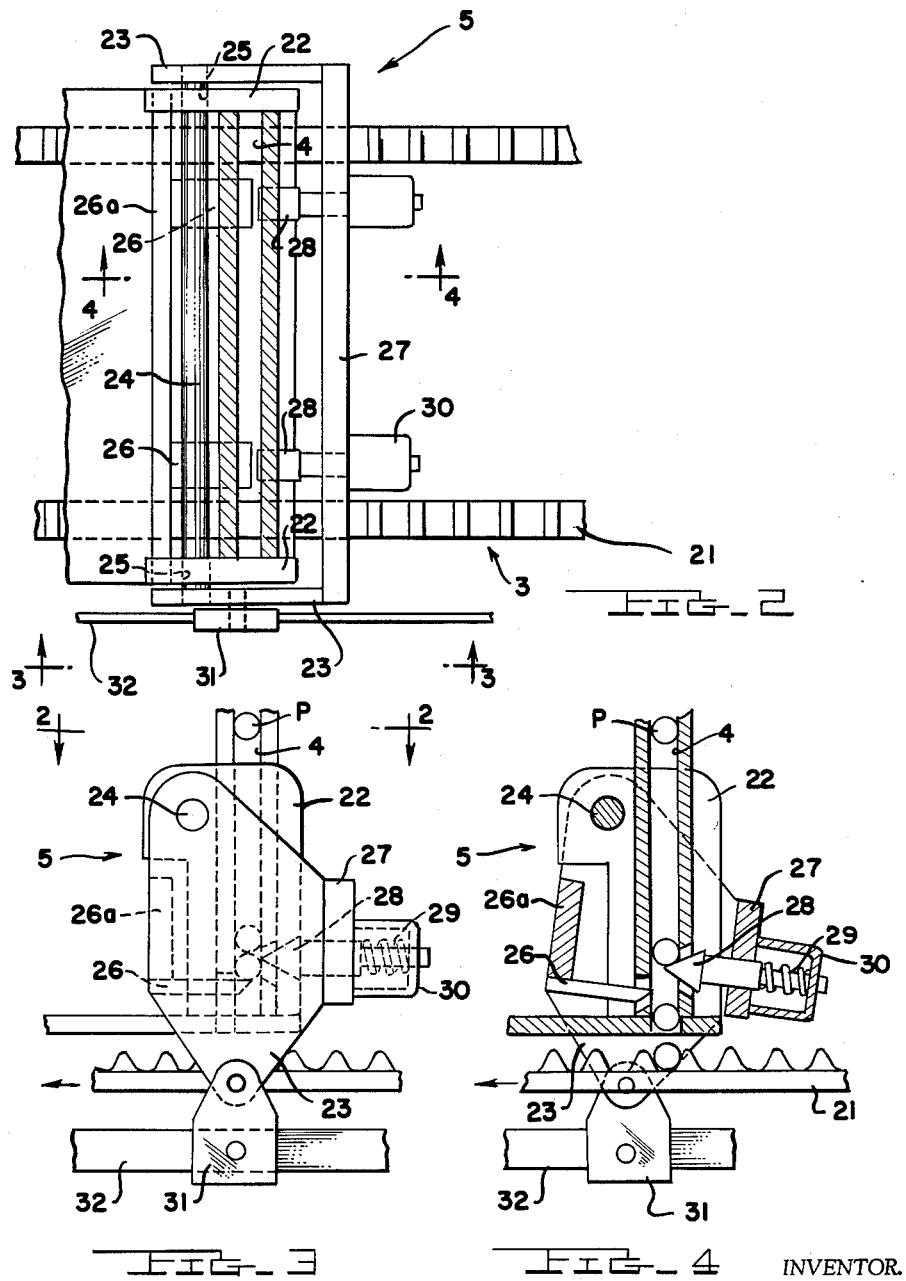

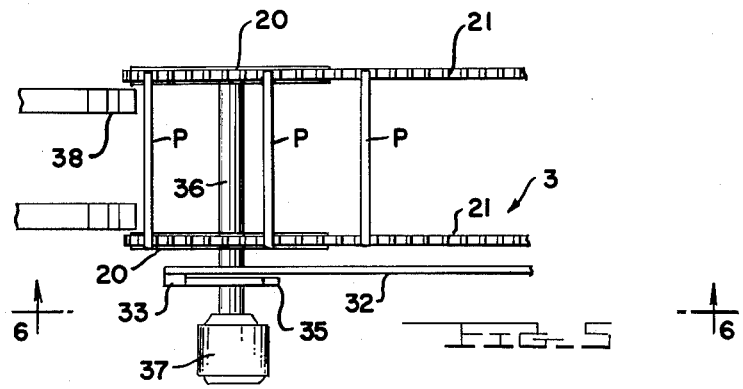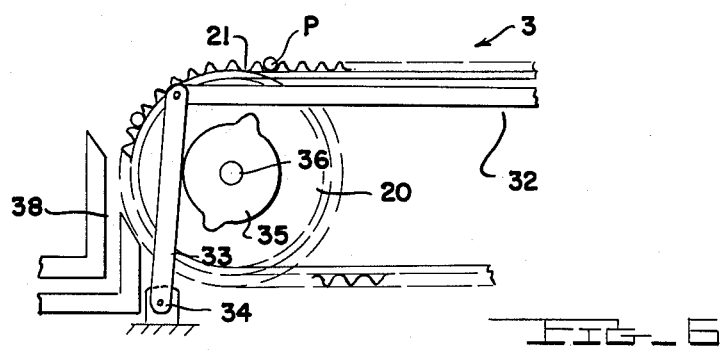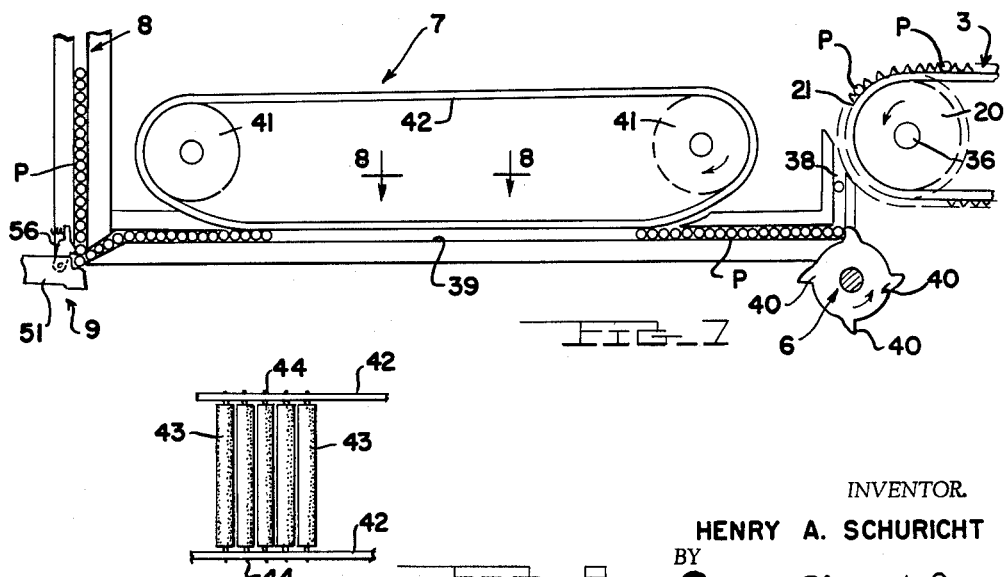

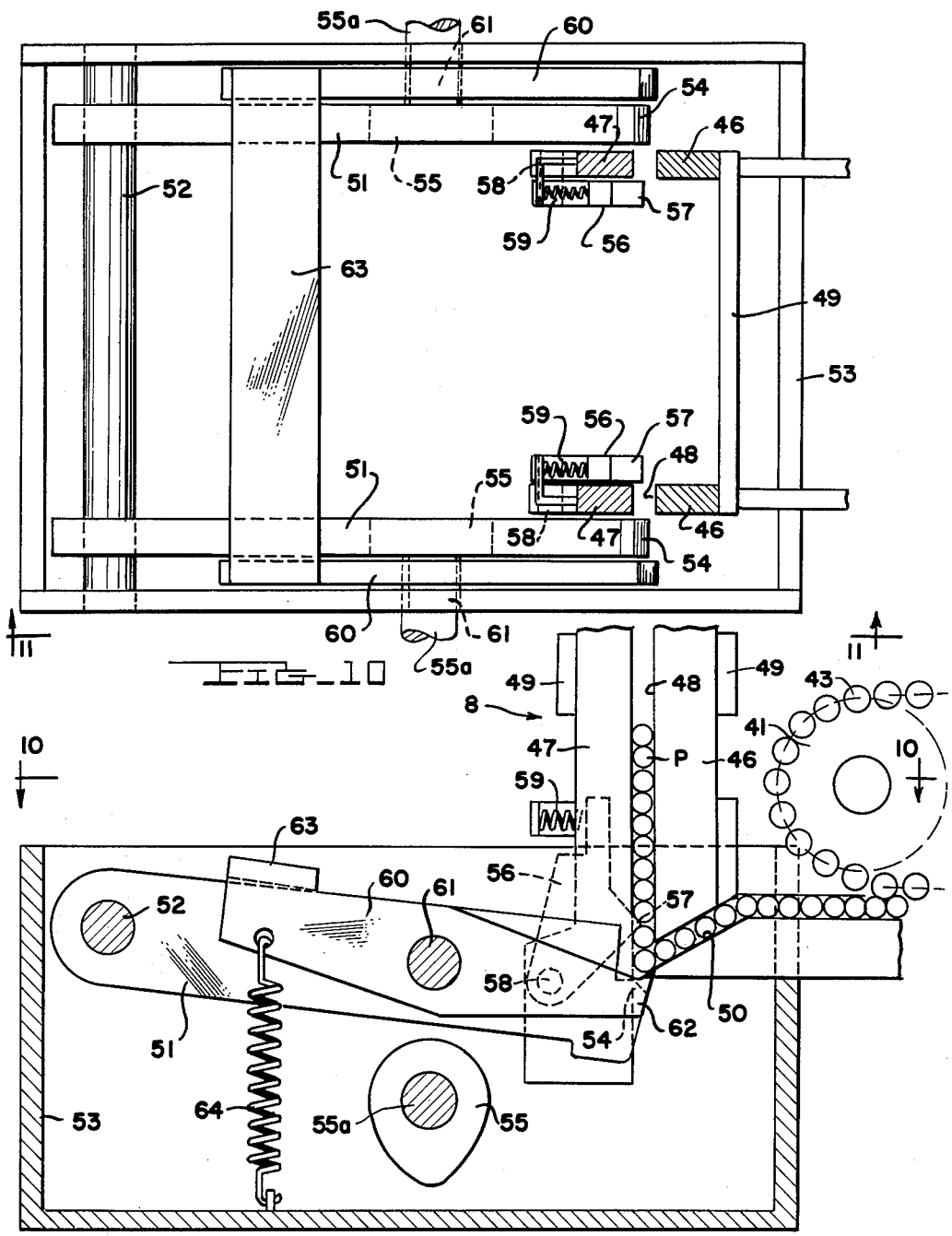

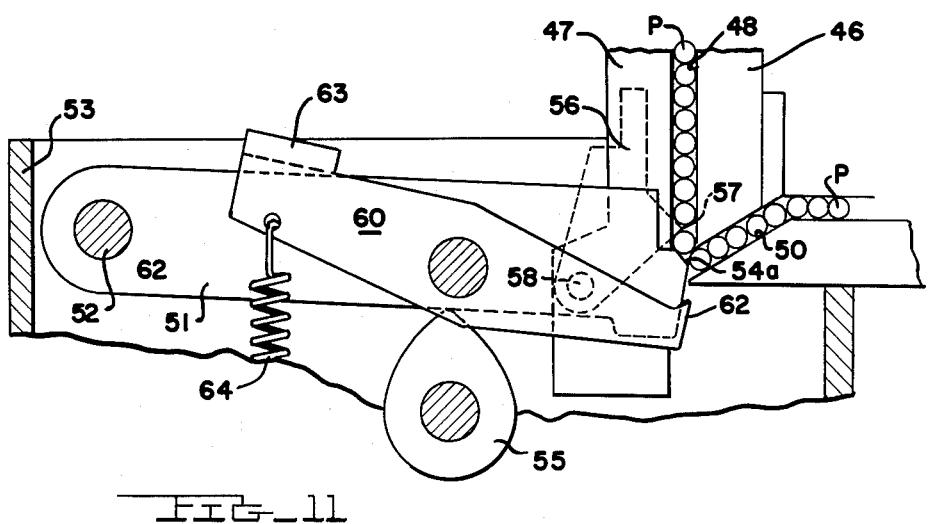
FIG_11
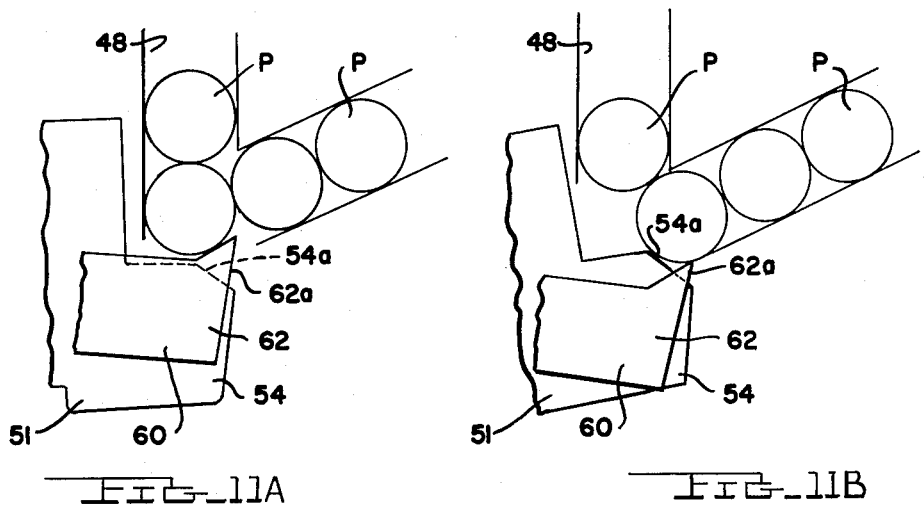
FIG_11A  FIG_11B

Oct. 26, 1965   H. A. SCHURICHT   3,214,004
CONVEYOR SYSTEM
Filed Dec. 12, 1962   8 Sheets-Sheet 6
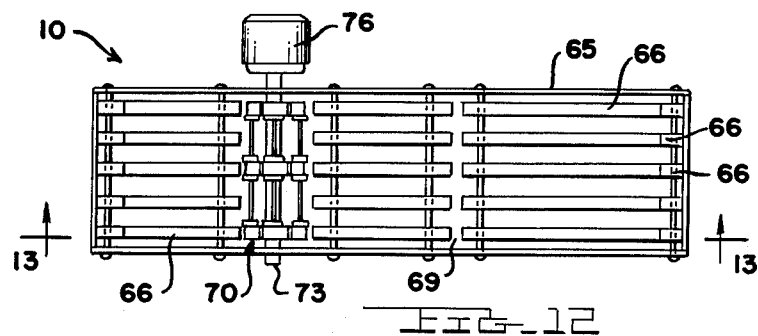
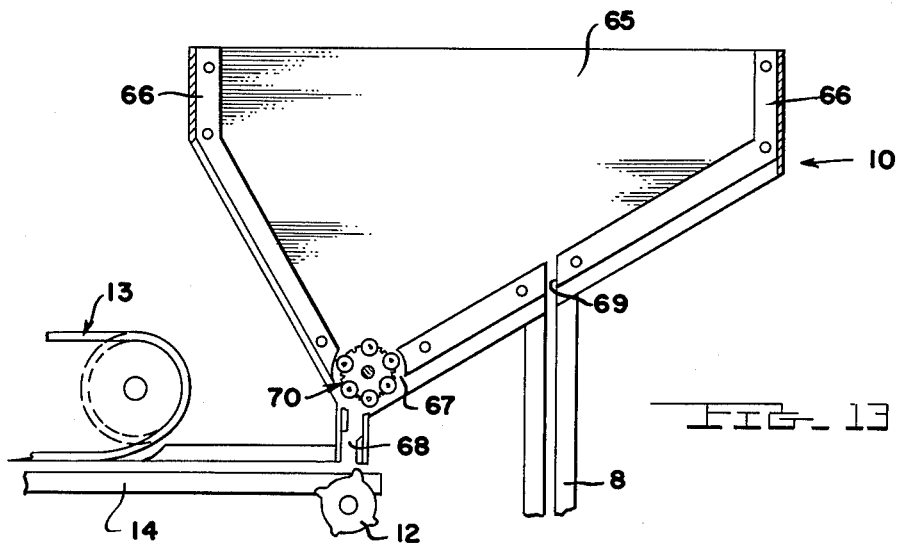
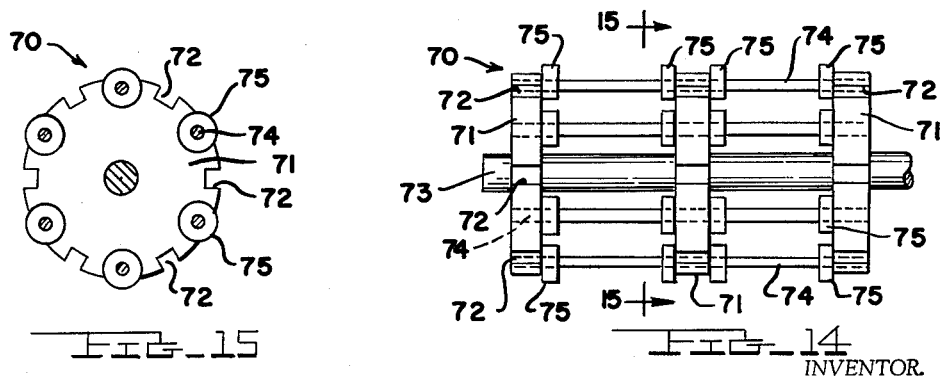
INVENTOR.
HENRY A. SCHURICHT
BY
Cullen, Sloman & Cantor
ATTORNEYS

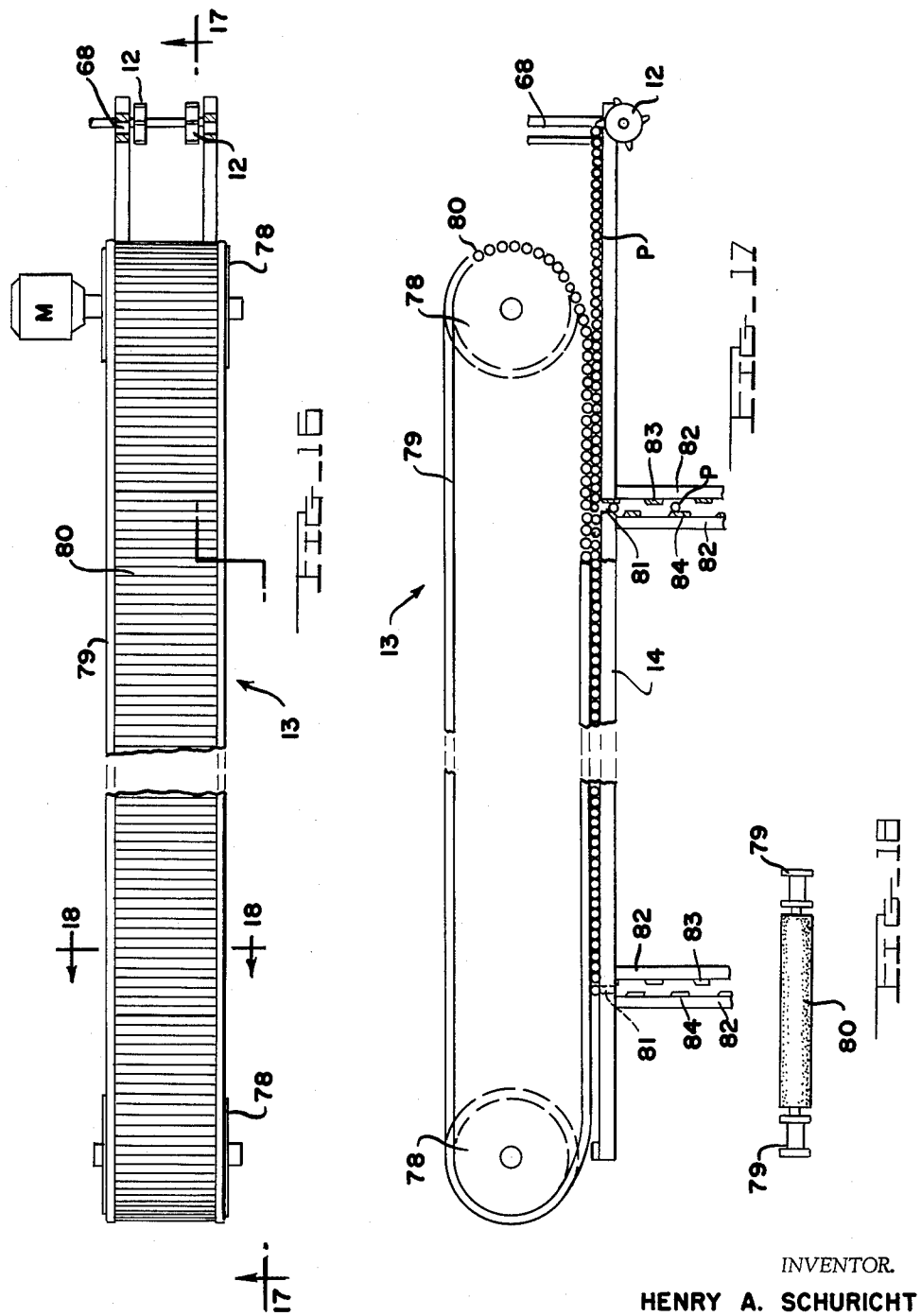

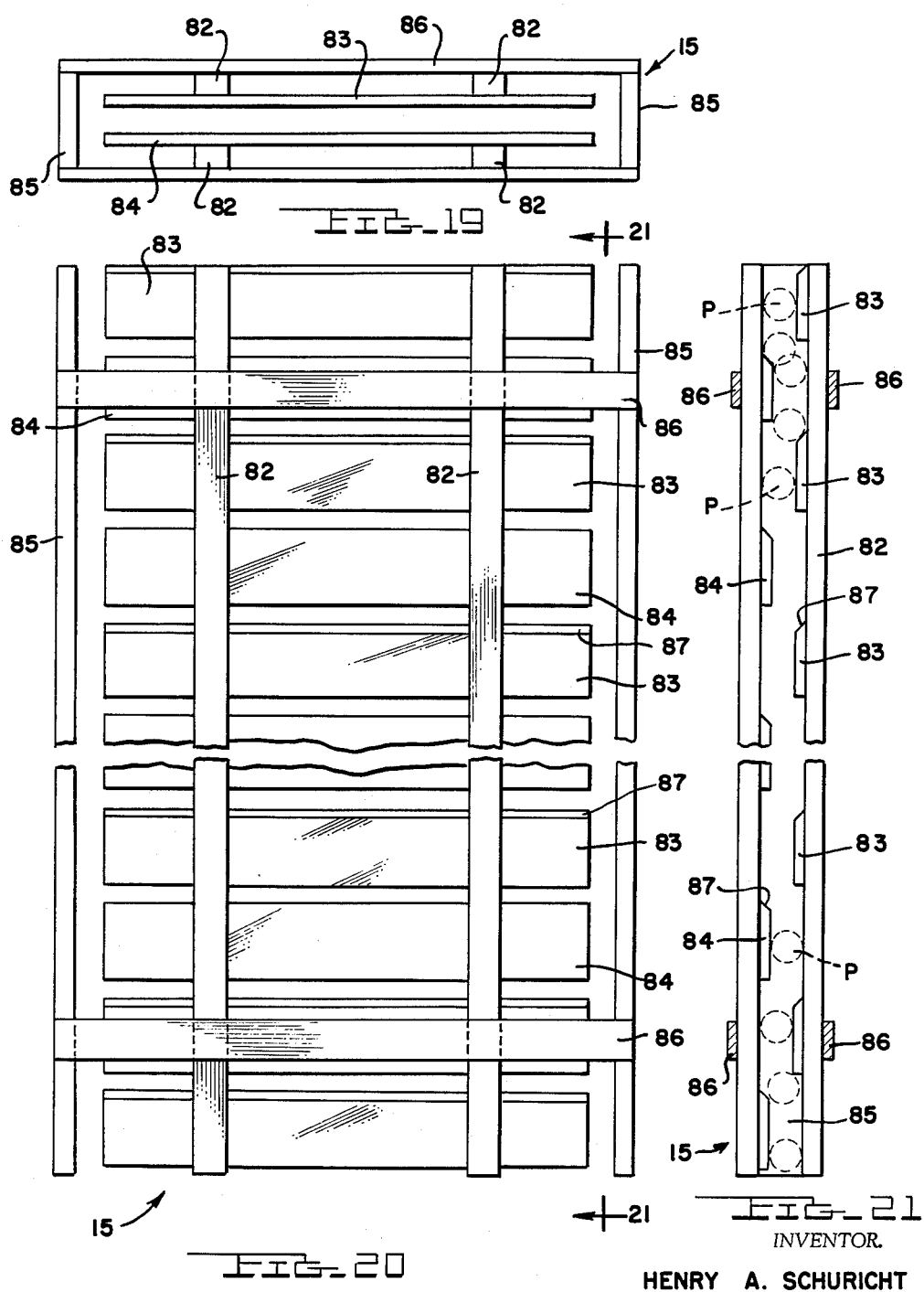

United States Patent Office 3,214,004
Patented Oct. 26, 1965

3,214,004
CONVEYOR SYSTEM
Henry A. Schuricht, Pontiac, Mich., assignor, by mesne assignments, to Hydromation Engineering Company, Plymouth, Mich., a corporation of Michigan
Filed Dec. 12, 1962, Ser. No. 244,062
2 Claims. (Cl. 198—168)

This invention relates to a conveyor system, and more particularly to a conveyor system useful for conveying, at high speed, large quantities of identical, elongated, small diameter, round rod-like parts from one work station or machine to another.

Long, thin, rod-like parts, such as the push rods of automotive engines, are difficult to handle in ordinary conveying equipment. Hence, in the manufacture of such parts, particularly in the automotive industry, it is conventional to convey such type parts in tote boxes in which the parts are manually loaded and unloaded, one by one.

Hence, it is an object of this invention to provide an automatic conveyor system useful for conveying long, narrow, round rod-like parts in large quantity and at unusually high rates of speed, while maintaining the parts in alignment.

A further object is to provide a conveying system in which the conveyed parts are packed together to form a band-like formation which is moved at a rate of speed greater than that possible to move the parts individually.

These and other objects and advantages of this invention will become apparent upon reading the following description with reference to the attached drawings.

In these drawings:

FIG. 2 is a plan view taken in the direction of arrows 2—2 of FIG. 1 and also 2—2 of FIG. 3 of the parts metering control.

FIG. 3 is an elevational view of such control taken in the direction of arrow 3—3 of FIG. 2.

FIG. 4 is a view similar to FIG. 3 but taken in the direction of arrows 4—4 of FIG. 2 and showing the control in discharge position.

FIG. 5 is a plan view of a portion of the collection conveyor taken in the direction of arrows 5—5 of FIG. 1.

FIG. 6 is an elevational view of such collection conveyor taken in the direction of arrows 6—6 of FIG. 5.

FIG. 7 is a schematic, elevational view of the preload conveyor with portions of the elevator and collection conveyor shown.

FIG. 8 is a view taken in the direction of arrows 8—8 of FIG. 7 of a portion of the preload conveyor.

FIG. 9 is an enlarged elevational view of the lift mechanism of the elevator and FIG. 10 is a plan view taken in the direction of arrows 10—10 of FIG. 9 and also 10—10 of FIG. 1.

FIG. 11 is a fragmentary view of the lift mechanism, in lifting position, taken in the direction of arrows 11—11 of FIG. 10.

FIGS. 11A and 11B are enlarged fragmentary views of a portion of the lift mechanism showing normal operation and abnormal operation thereof, respectively.

FIG. 12 is a plan view of the hopper taken in the direction of arrows 12—12 of FIG. 1 and FIG. 13 is an elevational view of the hopper taken in the direction of arrows 13—13 of FIG. 12.

FIG. 14 is an elevational view of the storage hopper discharge rotor, and

FIG. 15 is a cross-sectional view taken in the direction of arrows 15—15 of FIG. 14.

FIG. 16 is a top plan view of the distribution conveyor taken in the direction of arrows 16—16 of FIG. 1 and FIG. 17 is an elevational view taken in the direction of arrows 17—17 of FIG. 16.

FIG. 18 is a view of a portion of the discharge distribution conveyor taken in the direction of arrows 18—18 of FIG. 16.

FIG. 19 is a top plan view taken in the direction of arrows 19—19 of FIG. 1 of a descent chute.

FIG. 20 is a front elevational view of such descent chute, and

FIG. 21 is a side view thereof taken in the direction of arrows 21—21 of FIG. 20.

*The conveyor system generally*

Figure 1:
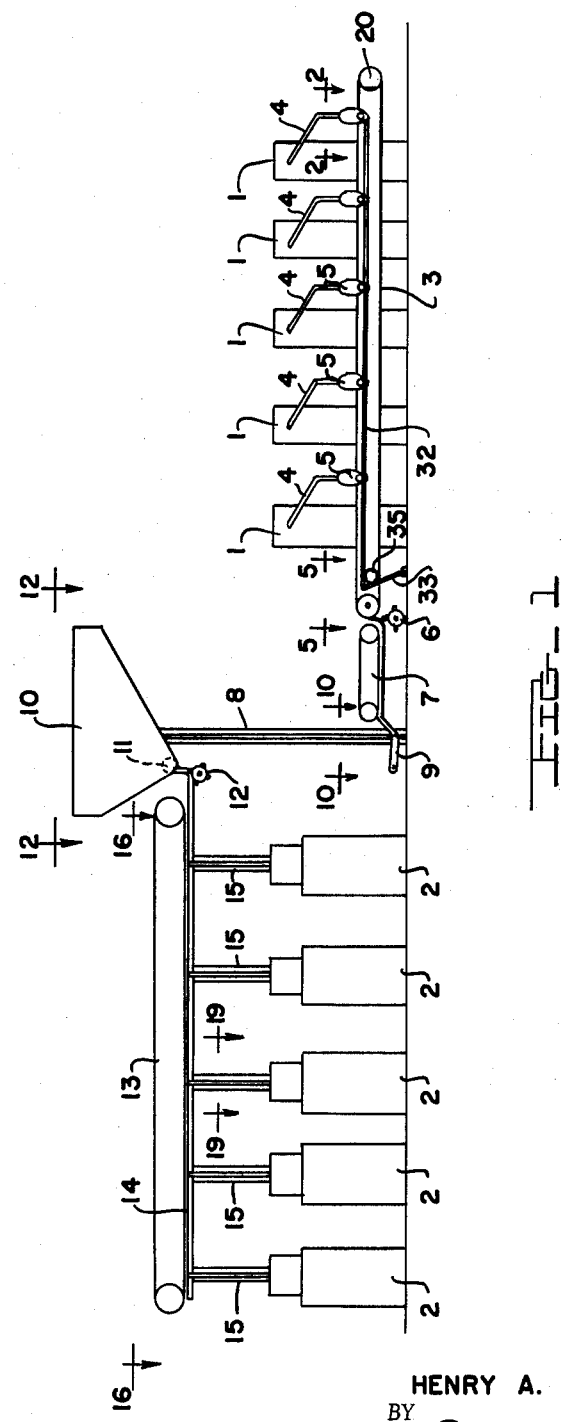
FIG. 1 is a schematic elevational view of the conveyor system as a whole.

FIG. 1 illustrates, schematically, the general arrangement of the conveyor system herein. Here, a number of cut-off machines 1 are arranged side by side, the machines each operating to cut long rods, of many feet in length, into dersired part length. The parts are long and of a small diameter in the range of about ¼–1 inch, such parts being used for example, for engine push rods as well as for other purposes.

Once the parts are cut to length, they are to be conveyed to machines 2 which may be used to finish machine the ends of the rods or drill holes in them, etc. Hence, the conveyor system conveys the long, thin unwieldly to handle, rods from the group of machines 1 to the group of machines 2.

The system includes a collection conveyor 3 which receives the cut-off parts discharged from the cut-off machines 1 through chutes 4 into metering devices 5 which deposit the parts upon the surface of the collection conveyor 3. Then the parts are carried to a transfer mechanism 6 which transfers the parts to a preload conveyor 7, in turn conveying the parts into the lower end of an elevator 8 having a lift mechanism 9 for lifting the parts into a storage hopper 10. From the storage hopper 10 the parts are fed by a hopper discharge rotor 11 to a transfer mechanism 12 and into a frictional drag discharge conveyor 13 which moves the parts along a surface 14, the parts discharging from the surface into descent chutes 15 and into the feed openings of the respective machines 2.

At all times, the parts are arranged axially parallel, and they are moved in a direction perpendicular to their axes. In certain areas of the system, the parts are packed together and moved as a band-like group of a number of parts rather than individually, thus permitting an unusually high speed of movement of the parts.

The various sections forming the conveyor system are described below.

*Collection conveyor and metering device*

The collection conveyor 3 (see FIGS. 5 and 6) is a conventional form of chain conveyor with two chains arranged to roll around sprockets 20. Added to the chain surfaces are upwardly opening notches 21 of a size to receive individual parts P and carry the parts in spaced, but parallel relationship.

After being cut to length in machines 1, the parts slide down chutes 4 (see FIG. 1) into a metering device 5 which is arranged to release the parts one by one on the collection conveyor 3.

The metering devices (see FIGS. 2–4) each comprise two, spaced apart, fixed plates 22 and two outer pivot plates 23 which pivot plates are interconnected by a shaft 24 journalled through openings 25 in the fixed plates so that both pivot plates simultaneously pivot with the shaft. The pivot plates carry two or more horizontally arranged blades 26 supported upon a cross member 26a, the blades being arranged to fit into the parts receiving space of chute 4 to interrupt the downward movement of parts P in the chute. A second cross bar 27 fastened to the pivot plates carries two or more wedges 28 journalled in the bar and extending rearwardly therefrom, and each spring biased in the direction of the blade by a coil spring 29 located in a spring housing 30.

One pivot plate 23 is connected by bracket 31 to a control rod 32 which is connected to a lever 33 (see FIG. 6) pivotally connected at 34 to a fixed support and contacted by a cam 35 mounted upon the same shaft 36 which interconnects and drives the sprockets 20, such shaft being powered by a motor 37.

Hence, in operation, a part P slides down the chute 4 and falls between the fixed plates 22 and on the top of the blade 26 (see FIG. 3). As the cam 35 rotates, its lobe moves the lever 33 which moves rod 32 to pivot the pivot plates 23 to the point where the blade 26 moves out of chute 4 (see FIG. 4) permitting the lowest part therein to fall out of the bottom of the chute on to the top of the conveyor 13 and into the notches thereof. Meanwhile, the wedge 28 blocks the parts above the one released part from falling through the chute. The wedge being spring mounted, will retract against pressure of a jammed part in the chute and will spring urge the part loose.

Since a number of these meters are simultaneously operated by the link 32, the conveyor is so timed relative to the operation of the meters that the meters will release a first group of parts onto the conveyor and will release the next group only into empty notches.

*Preload conveyor*

The parts discharged from the collection conveyor 3 are dropped down a chute 38 (see FIG. 7) upon a conveyor guide surface 39 for guiding the parts and holding them in parallel alignment. The parts are initially moved from the chute 38 to the surface 39 by powered transfer wheel 6 having lobes or bumps 40 formed thereon to move the parts.

Once on the support surface 39, the parts move underneath the lower lap of an endless conveyor belt 7 (see FIG. 7) having power driven sprocket wheels 41 and a suitable conveyor chain 42 between which are connected a large number of identical rod-like rollers 43. These rollers are closely spaced together to the point of almost touching and are connected at their centers by pins 44 to the chains 42 so that they may rotate about their axes. The lower lap of the conveyor is loose and frictionally drags upon the top surface of the parts. The rollers 43 are slightly larger in diameter than are the parts. The rollers compact the parts together into a band-like shape where the parts are in lengthwise contact and jammed together into a single thickness band which is rapidly moved by the frictional drag of the conveyor rollers 43. In the event that the parts are not taken off the support 39 rapidly enough, the parts stop but the rollers continue to roll across the surfaces of the parts as the conveyor continues its movement.

*The parts elevator*

The parts are conveyed by the preload drag conveyor into the feed end of elevator 8 which raises the parts a considerable distance above the floor and deposits them into the hopper 10.

The elevator (see FIGS. 9, 10 and 11) comprises two pairs of spaced apart vertical tracks 46 and 47 having between them a space 48 which is slightly greater than the diameter of the parts so that the parts may have their ends fit between the spaces of the two tracks 46 and 47 for movement upwardly. The two pairs of tracks 46 and 47 are connected in a ladder-like shape by cross-bars 49 which rigidify them and hold them in shape and place.

The parts are fed down an incline chute 50 from the conveyor 7 to the lower or feed open end of the elevator tracks. At this point, a lift mechanism raises the one part aligned with the open end of the track upwardly a distance equal to the diameter of the part and the part is retained there by a latch so that ultimately a column of parts builds up above the latch, the column advancing upwardly part by part as a new part is constantly shoved upwardly in the tracks. When the tracks are filled, the top part is pushed out of the upper end of the tracks each time a part is shoved in at the lower end.

The lift mechanism includes a pair of levers 51 interconnected by a shaft 52 which is journalled in a support housing 53. The opposite ends of the levers 54 form lift ends and the levers are pushed upwardly by a power-driven cam 55 mounted on shaft 55a so that as the cam rotates, the lift levers move the parts upwardly a distance slightly more than the diameter of one part. The parts are held from falling downwardly by latches 56 having a latch tongue 57 fitted into the space 48. The latches are pivotally connected at 58 to the lower ends of the tracks 47 and are pressed by springs 59 into latching position in the space 48. However, as the lift lever raises a part, the pressure of the part against the bottom of the tongue 57 causes the latch to swing out of the way against the spring resistance to permit the part to pass, after which the latch tongue is spring-urged back into position to block the track space 48.

The lift mechanism also includes a pair of cradle levers 60 pivoted by shafts 61 to the housing 53 and having cradle ends 62 located adjacent the lift ends 54 of the lift levers and opposite contact ends having a cross-piece 63 passing over and in contact with the upper edges of the lift levers, with the contact ends being pulled downwardly by springs 64, which also pull the lift levers downwardly due to the cross-piece 63 pulling downwardly against the lift levers.

FIG. 11A illustrates the normal operation of the lift mechanism.

Here, the end 54 of lift lever 51, which is provided with a bevel edge 54a is aligned beneath the lowest part which enters space 48 from incline chute 50, with the high point of the bevel 54 approximately vertically aligned with the part center. FIG. 9 illustrates this position also. The cradle end 62, having an upper tooth formation 62a also support the part. When the high point of cam 55 rotates upwardly, the lift lever end 54 lifts the part upwardly and the cradle end 62 likewise moves downwardly (see FIG. 11).

FIG. 11B illustrates a case where the lowest part has not fully entered the space 48 and hence, is in a position to jam the mechanism. Hence, the rising bevel end 54a contacts the part off-center and forces the part back up the incline chute 50 where it can later fall back, properly aligned, into space 48 when the end 54 lowers. Meanwhile, the tooth formation 62a of the cradle lever moves down out of the way so that the part can be forced back.

*The storage hopper*

As shown in FIGS. 12–15, the storage hopper 10, is formed of vertical side walls 65 and bottom and ends made of bars 66. The space between the side walls 65 is just slightly larger than the length of the rods to be accommodated, the rods being stored perpendicularly to the walls 65. The parts are discharged through opening 67 into a discharge chute 68 and are fed into the hopper through a feed opening 69.

The parts are controlled in their discharge through the opening 67 by a rotor 70 (see FIGS. 14 and 15) which comprises several spaced apart discs 71, having aligned part-receiving notches 72, and interconnected by a shaft 73. In addition, they are further interconnected by roller shafts 74 upon which are mounted rotatable rollers 75 which extend outwardly beyond the perimeter of the discs 71. Shaft 73 is power driven by motor 76. Hence, as the rotor rotates, parts drop into the part receiving notches 72 and are carried and dropped into the chute 68. The rollers 75 form rolling contact with the mass of parts above the rotor and constantly stir and agitate these parts to guide them into the notches and to prevent them from becoming so tightly packed together that they form a cavity, above the rotor, which might otherwise prevent parts from falling into the rotor notches.

*Discharge drag conveyor*

When the parts drop down the hopper chute 68 they are positioned upon a support surface 14, which may be in the form of elongated tracks, and are pushed by the transfer wheel 12 having lobes or teeth to move the parts underneath the lower lap of drag conveyor 13. This conveyor is similar in construction to conveyor 7 previously described, having sprockets 78 around which chains 79 are carried, the chains being interconnected by the bars 80 which are pivotally connected to the chains for rotation about their axes. The lower lap of the conveyor drags upon the parts and bunches them together into the band-like configuration, thus dragging them at high speed along the top of surface 14 (see FIGS. 13, 16–18).

Slots 81 are provided in the support surface 14 through which the parts may drop into descent chutes 15.

Preferably, where high speed operation is desired, the drag conveyor 13 is operated in a cycle consisting of first, extremely high speed forward movement so that the band of parts are packed together into the band which moves rapidly along the surface 14. Then the movement of the drag conveyor is momentarily stopped, and then it is momentarily reversed and then momentarily stopped again to loosen the parts relative to each other before repeating the cycle. The momentarily loosening of the parts upon reversal of movement of the band permits individual loose parts to easily fall through the slots 81.

*The descent chutes*

The descent chutes are so formed as to guide the part descending from the drag conveyor into the intake of the working machine 2 and to maintain the part in its axially horizontal aligned position. Hence, the chute is formed of two pair of spaced apart vertical strips 82 each having secured thereto spaced apart plates 83 and 84, the plates being formed into two vertical rows with the plates of one row being vertically offset relative to the plates of the next row so that a part descending will contact one of the vertical plates and the opposed pair of vertical strips 82. A reinforcing and support framework of vertical end strips 85 and cross strips 86 is provided to prevent the parts from shifting endwise out of the descent chute.

The upper edges of each of the plates 83 and 84 are inwardly bevelled as at 87 to guide the descending part which strikes it in a downwardly direction. Hence, as the part falls it strikes the upper edge of one strip where it hesitates for a moment and levels out horizontally and then rolls down the bevelled edge 87 between that plate and the opposite vertical strips 82 until it strikes the next lower plate. The plates are spaced apart at their upper and lower adjacent edges a sufficient distance to permit the part to roll therebetween.

This invention may be further developed within the scope of the following attached claims. Accordingly, the foregoing description should be read as being merely illustrative of an operative embodiment of this invention and not in a strictly limiting sense.

I now claim:

1. Apparatus for conveying a plurality of like elongate cylindrical parts in a direction normal to their length with said parts disposed in abutting side-by-side relationship comprising frame means defining a support surface for supporting and guiding the parts in rolling motion along a predetermined path extending from a parts inlet to a parts outlet, a plurality of like elongate rollers coupled to each other for free rotation in adjacent parallel side-by-side relationship to define an endless conveyor belt with said rollers extending transversely of said belt, spaced belt support means mounted for rotation about parallel horizontal axes supporting said belt above said fixed path in aligned relation therewith, the lower run of said endless belt being loose and adapted to sag in its extent between said belt support means into contact with the upper surface of cylindrical parts on said fixed path, and means for driving said belt support means to drive said belt in a direction wherein the sagging lower run of said belt frictionally conveys parts along said fixed path to said parts outlet.

2. Apparatus as defined in claim 1 wherein said rollers are of a diameter slightly larger than the diameter of said parts and are coupled to each other by a pair of endless chains, said parts outlet comprising means defining a slot extending transversely across said horizontal support surface defining the upper end of a discharge chute.

References Cited by the Examiner

UNITED STATES PATENTS

| | | | |
|---|---|---|---|
| 778,301 | 12/04 | Burdick | 193—27 X |
| 787,623 | 4/05 | Hood | 221—174 |
| 1,192,561 | 7/16 | Reiser | 198—43 |
| 1,292,636 | 1/19 | Parker | 214—6 |
| 1,352,329 | 9/20 | Tschache | 198—82 |
| 1,462,126 | 7/23 | Ross | 193—27 |
| 1,497,576 | 6/24 | Molins | 221—174 |
| 1,548,600 | 8/25 | Hansen | 198—43 |
| 1,590,957 | 6/26 | Schaffner | 221—290 |
| 1,729,237 | 9/29 | Albertoli | 198—43 X |
| 1,802,631 | 4/31 | Crosby | 221—290 |
| 2,105,929 | 1/38 | Rehnberg | 193—27 |
| 2,515,684 | 7/50 | Ambrette | 198—160 X |
| 2,587,959 | 3/52 | Biner | 198—110 X |
| 2,609,916 | 9/52 | Kendall | 198—82 |
| 2,649,951 | 8/53 | Sandberg | 198—110 X |
| 2,890,780 | 6/59 | Schuricht | 193—27 |
| 3,039,624 | 6/62 | Campbell | 214—6 |

SAMUEL F. COLEMAN, *Primary Examiner.*

ABRAHAM BERLIN, EDWARD A. SROKA,
*Examiners.*